United States Patent [19]
Hayden et al.

[11] 3,948,735
[45] Apr. 6, 1976

[54] CONCENTRATION AND PURIFICATION OF PLUTONIUM OR THORIUM

[75] Inventors: John A. Hayden, Arvada; Carl E. Plock, Golden, both of Colo.

[73] Assignee: The United States of America as represented by the United States Energy Research and Development Administration, Washington, D.C.

[22] Filed: June 1, 1973

[21] Appl. No.: 365,917

[52] U.S. Cl............................... 204/1.5; 204/253
[51] Int. Cl.².................. C01G 56/00; C25C 1/22
[58] Field of Search .................................. 204/1.5

[56] References Cited
UNITED STATES PATENTS

| | | | |
|---|---|---|---|
| 3,086,925 | 4/1963 | Didchenko et al. | 204/1.5 |
| 3,272,726 | 9/1966 | Gibson et al. | 204/1.5 |
| 3,821,091 | 6/1974 | Bilal et al. | 204/1.5 |

*Primary Examiner*—Leland A. Sebastian
*Attorney, Agent, or Firm*—John A. Horan; Dudley W. King; Ignacio Resendez

[57] ABSTRACT

In this invention a first solution obtained from such as a plutonium/thorium purification process or the like, containing plutonium (Pu) and/or thorium (Th) in such as a low nitric acid ($HNO_3$) concentration may have the Pu and/or Th separated and concentrated by passing an electrical current from a first solution having disposed therein an anode to a second solution having disposed therein a cathode and separated from the first solution by a cation permeable membrane, the Pu or Th cation permeating the cation membrane and forming an anionic complex within the second solution, and electrical current passage affecting the complex formed to permeate an anion membrane separating the second solution from an adjoining third solution containing disposed therein an anode, thereby effecting separation and concentration of the Pu and/or Th in the third solution.

6 Claims, 3 Drawing Figures

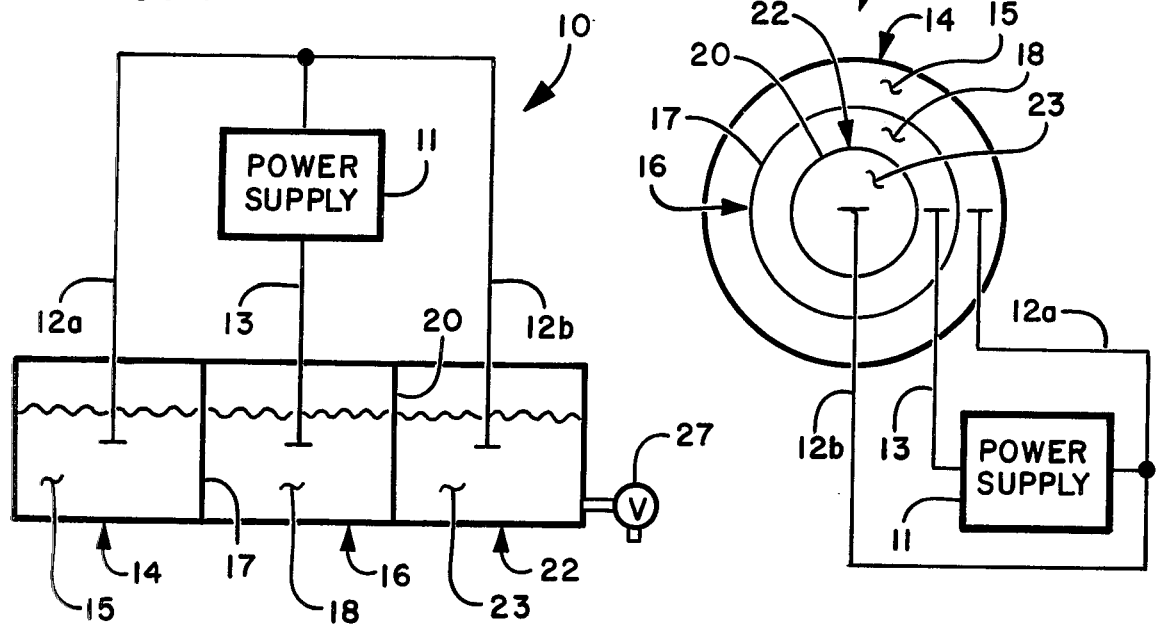
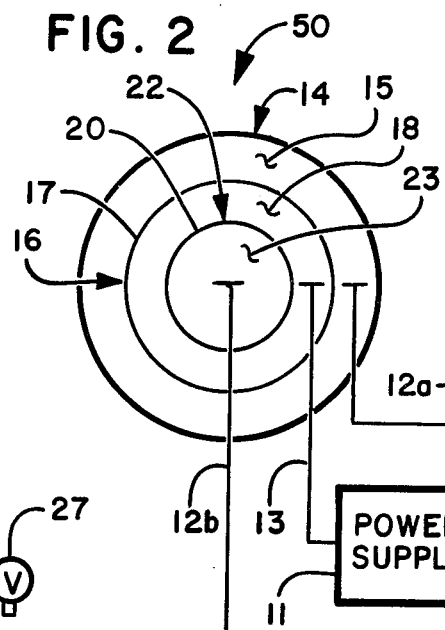
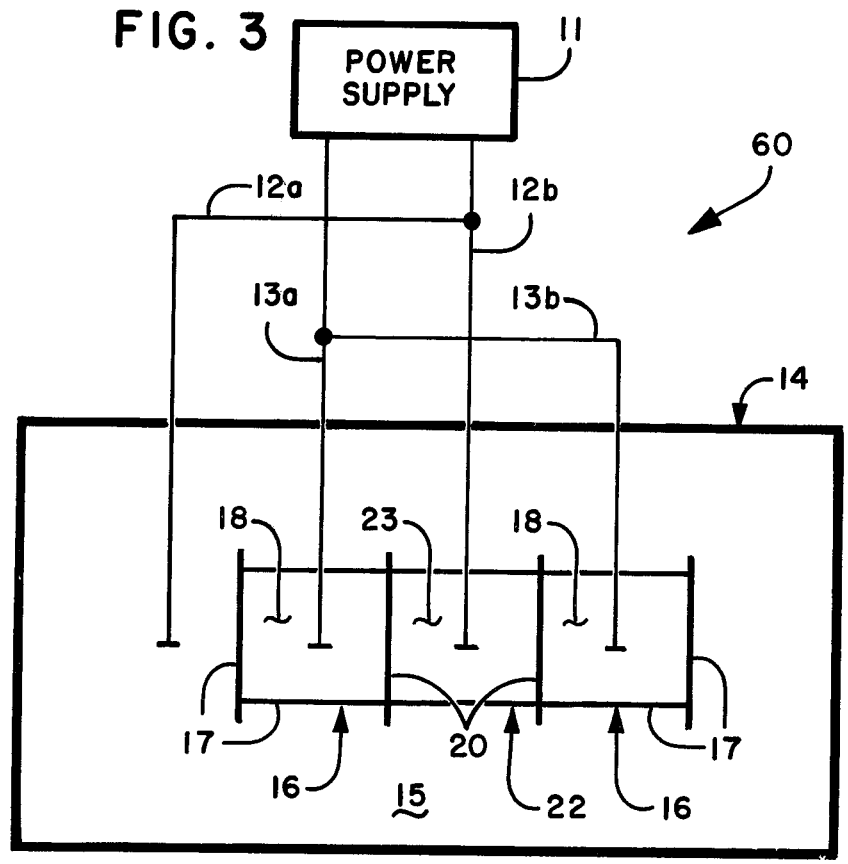

CONCENTRATION AND PURIFICATION OF PLUTONIUM OR THORIUM

BACKGROUND OF INVENTION

The recovery of actinide material used in radioisotopic nuclear fuel applications and the like is important not only because of the economic cost to produce the actinide material originally, but also because of the problems involved in disposing of material containing radioisotopes. Prior methods of recovering actinide materials from such as low $HNO_3$ concentration solutions which may be frequently encountered in processes for purifying and recovering actinide materials have various drawbacks. These drawbacks may include the formation of waste materials which are difficult to dispose and also extensive multistep processing required in order to achieve recovery of even small amounts of these materials. An important limitation in the prior art recovery methods is the concentration limit requirements of the actinide element so that with very low actinide element concentrations, such as below about $10^{-6}M$ concentration, recovery may not be feasible. Impurities which may be encountered in solutions from which the Th or Pu must be removed are such as aluminum, americium, beryllium, calcium, iron, lithium, and silicon.

SUMMARY OF INVENTION

In view of the prior art limitations and drawbacks, it is an object of this invention to provide a simple and economically attractive method of separating, concentrating and purifying Pu or Th from solutions containing these.

It is a further object of this invention to provide a method of removing Pu or Th from large volume solutions which contain these elements without, in turn, creating large amounts of waste material and the attendant problems of disposing of same, and concurrently reducing extensive prior art processing requirements to achieve desired purifications and recovery of Pu and/or Th.

It is a further object of this invention to provide a method for separating americium from plutonium.

Various other objects and advantages will appear from the following description of the invention and the most novel features will be particularly pointed out hereinafter in connection with the appended claims. It will be understood that various changes in the details, materials and arrangements of the compartment or cells which are herein described and illustrated in order to explain the nature of the invention may be made by those skilled in the art without departing from the principles and scope of this invention.

The invention comprises, in brief, applying an electrical current between a feed solution containing Pu and/or Th in $HNO_3$ and a high molarity $HNO_3$ concentration solution in a separate compartment with a cation permeable membrane disposed between said high molarity $HNO_3$ concentration compartment and the feed solution, so as to effect migration of the Pu or Th cation into the concentration compartment, and thereafter effect formation of an anionic complex such as thorium hexanitrate $[Th(NO_3)_6]^{2-}$, which complex is attracted by a positive electrode disposed within an adjoining or purification compartment separated from the concentration compartment by an anion permeable membrane which permits permeation or passage of the hexanitrate complex into the purification compartment.

DESCRIPTION OF DRAWING

FIG. 1 illustrates schematically one embodiment of an apparatus suitable for effecting this invention.

FIG. 2 illustrates schematically a top view of an alternate embodiment of apparatus which may be used in this invention.

FIG. 3 illustrates schematically a further embodiment which is suitable for effecting this invention.

DETAILED DESCRIPTION

As shown in FIG. 1, apparatus 10 may be used for performing this invention. Disposed as part of the apparatus is a direct current power supply 11 which provides the electrical bias and current through the various solutions between anodes 12a and 12b and cathode 13. An anode or positive electrode 12a may be disposed within the feed solution 15 and the feed solution 15 disposed within a first container, compartment or cell 14. The feed solution 15 may contain low concentrations of Pu and/or Th (such as about $10^{-3}$ grams per liter or less) and low $HNO_3$ concentration (such as about 1M $HNO_3$ or less). It is understood that this process and apparatus may be used to purify Pu or Th having higher concentrations, if desired, such as greater than about $10^{-6}M$ Pu or Th, and that the nitric acid concentration range in the feed solution may be from about 0.1M to about 1M. Application of a current between anode 12a and cathode or negative electrode 13 will effect repulsion from anode 12a of $Pu^{3+}$, $Pu^{4+}$, $Th^{4+}$ or other cations which may be in the solution and attraction of the cations by cathode 13. Cathode 13 may be disposed within concentration compartment or second container 16 containing a suitable high molarity $HNO_3$ solution 18, such as between 6M and 8M. The attraction of cathode 13 to the cations in the feed solution 15 results in migration of the cations to and through the cation permeable membrane 17 which separates the concentration compartment or second container 16 from the feed solution chamber or first container 14. Cations passing or permeating through the cation permeable membrane 17 may, once in concentration compartment 16, form an anionic complex. Cations of such as Pu or Th form plutonium or thorium hexanitrate complexes respectively. Although other cations may permeate cation permeable membrane 17, very few of these cations form nitrate complexes. Other cations which may be present in feed solution 14 may be aluminum, americium, beryllium, calcium, iron, lithium, and silicon. These cations do not form anionic complexes within concentration compartment 16.

Formation of the plutonium or thorium hexanitrate complex results in a repulsion of the anionic complexes from the negative electrode, i.e., the cathode 13, and attraction of the same complexes by the positive charged electrode, i.e., the anode 12b disposed in a purification compartment or third container 22 adjoining the concentration compartment 16. The solution 23 present in purification chamber 22 may be from about 6M to about 8M $HNO_3$. The purification compartment 22 is separated from the concentration compartment 16 by an anion permeable membrane 20 which permits passage of anions such as the plutonium or thorium hexanitrate anionic complexes in the direction of the anode, but does not permit passage of cations into purification chamber or third container 22. Further, even though the anode 12a in the feed solution may tend to influence or affect the direction of anion complex travel, these are not able to pass the cation permeable membrane 17. The only other cations which may have migrated from the feed solution into concentration compartment 16 and which may pass into purification chamber or compartment 22 are those which also form anionic complexes. Since these are very few, such as neptunium $^{(4+)}$ or gold$^{(3+)}$, which are generally not found in the feed solution, in most situations the net result is that only Th or Pu complexes will be found in the purification solution 23 within the purification compartment 22.

It will be noted from the drawing that the design of the apparatus may be altered simply by extending the series or array of compartments to include a larger number of compartments and disposing the cationic permeable membrane in an area which allows introduction of more or greater amounts of feed solution for separation of the cations and subsequent formation and separation of the anionic complexes. The embodiment as illustrated is intended only to simplify the explanation of this invention and is not intended to restrict the invention to the use of this embodiment.

FIGS. 2 and 3 illustrate schematically other configurations which may be used, with the numbers denoting the same members of FIG. 1 in order to facilitate explanation and understanding. The embodiment 50 of FIG. 2 and the embodiment 60 of FIG. 3 provide advantages such as larger anion and cation permeable membranes enabling processing of large quantities of solution, more efficient operation per volume of space occupied, faster separation and concentration rates, etc.

In FIG. 2, the first 14 and second 16 containers are of generally annular configuration with the first surrounding the second which in turn surrounds the third container. Cation permeable membrane 17 is disposed as an annular wall intermediate the first and second containers and anion permeable membrane 20 is disposed as an annular wall intermediate the second and third containers. Although not illustrated herein, it is within the skill of the art to include a plurality of electrodes herein, it is within the skill of the art to include a plurality of electrodes spaced generally annularly to optimize ion passage through the membranes.

In FIG. 3, the first container 14 may be of generally rectangular or any other configuration and may generally surround second container 16 which now comprises two compartments having cathodes 13a and 13b and third container 22. Generally rectangular second container compartments 16 may be disposed on two sides of generally rectangular third container 22 and anion permeable membrane 20 may be the intermediate walls between the second containers and the third container. The other walls of second container 16 may be cation permeable membranes 17 disposed intermediate the first and second containers. There is no permeable membrane between the third container and the first container so that there is no solution permeation of feed solution to purification solution or vice versa. As described above, a plurality of electrodes may be put or disposed in appropriate cells in order to attain more efficient current passage between electrodes, and thus ion transfer through the appropriate membranes.

The type of membrane material used for the cation or anion permeable membranes may be any nitric acid resistant permeable membrane with functional groups suitable for exchange of cations and/or anions. Of these cation permeable membranes containing sulfonate functional groups and an anion type permeable membrane with quaternary amine functional groups are preferred.

The current densities used in this invention may range from about 800 to about 5800 amperes per square foot and preferably from about 2900 to about 3500 amperes per square foot. An increase in the current density beyond upper limits may result in excessive gas formation and a decrease in the preferred current density may result in a reduction in efficiency. The temperature to be used in this reaction may vary from about ambient to about 50°C.

The types of electrodes which may be used as anodes and as cathodes may be selected from any of the platinum group metals but platinum electrode material is preferred.

The concentrated and purified Pu or Th solution 23 found in purification chamber 22 may be drawn off by appropriate piping valving means 27 at intervals or continuously, depending upon the requirements, and the acid solution required therein replenished as needed.

To illustrate the efficiency of this invention, solutions containing a concentration of 8.4 milligrams (mg) per liter (l) of Th were purified in 6 hours to a final solution recovered from the purification compartment containing 82.3 mg/l of Th.

The chemistries of thorium and plutonium are similar in this application. For example, because of its size and quadrivalent charge, Th cations will pass through the cation membrane at approximately the same rate as the Pu cations. Further, both form the hexanitrate complex in the range cited.

This invention has been practiced using feed solutions which have varying concentrations of Th and the use of this process has resulted in Th concentration recoveries as seen in the Table. Results, which were very good, indicate that this invention overcomes significant prior art problems in a relatively simple manner. As shown, various concentrations of feed solutions at varying current densities were purified for about 6 hours each using the process and apparatus of this invention. As noted, concentration factors range from 6.1 at low current density to 11.3 at the highest current density. It is to be understood that application of current for longer periods of time would have resulted in even more concentrated solutions.

| Thorium in Feed Solution mg/l* | Current in Amperes per Square Foot | Thorium in Purification Solution after Six Hours | Conc. Factor** |
|---|---|---|---|
| 10.6 | 800 | 64.7 mg/l | 6.1 |
| 8.4 | 2000 | 82.3 mg/l | 9.8 |
| 1.08 | 3600 | 12.2 mg/l | 11.3 |

*mg/l = milligrams per liter

**Concentration Factor = $\dfrac{\text{Thorium concentration in purification solution}}{\text{Thorium concentration in feed solution}}$ This invention may be used, as illustrative of a further application, to separate americium (Am) from Pu since the Am does not form an anionic hexanitrate complex.

What is claimed is:

1. A method for separating and concentrating materials selected from the group consisting of plutonium, thorium and mixtures thereof from a feed solution containing said materials as cations comprising passing an electrical current between a first anode in said feed solution and a cathode in a concentration solution through an intermediate cation permeable membrane thereby effecting repulsion of said cations from said feed solution through said cation permeable membrane into said concentration solution, said cations forming an anionic complex in said concentration solution; passing said electrical current between said cathode in said concentration solution and a second anode in a separate purification solution through an intermediate anion permeable additional membrane biasing said anionic complex to permeate said anion permeable additional membrane into said purification solution; and concentrating and recovering said materials within said separate purification solution.

2. The method of claim 1 wherein said material is of a concentration about equal to or less than $10^{-3}$ grams per liter, and said feed solution hhs a nitric acid concentration of between about 0.1 molar and about 1 molar concentration.

3. The method of claim 2 wherein said feed solution further contains americium and wherein said plutonium material is separated from said americium.

4. The method of claim 2 wherein said electrical current has a current density of from about 800 to about 5800 amps per square foot and wherein said solutions' temperature is from about ambient to about 50°C.

5. The method of claim 1 wherein said cation type permeable membrane contains sulfonate functional groups and said anion type permeable membrane contains quaternary amine functional groups.

6. The method of claim 1 wherein said concentration solution is from about 6 molar to about 8 molar nitric acid and said purification solution is from about 6 molar to about 8 molar nitric acid.

* * * * *